United States Patent Office 3,732,247
Patented May 8, 1973

3,732,247
3-DI-SUBSTITUTED METHYLENE PYRROLIDINES WHEREIN THE 1- OR N-LOWER-ALKYL SUBSTITUENT CONTAINS AT LEAST TWO CARBON ATOMS
Grover C. Helsley and Carl D. Lunsford, Richmond, Va., and John A. Richman, Jr., Rockville, Md., assignors to A. H. Robins Company, Incorporated, Richmond, Va.
No Drawing. Continuation-in-part of application Ser. No. 812,975, Apr. 1, 1969. This application Aug. 14, 1970, Ser. No. 63,916
Int. Cl. C07d 27/04
U.S. Cl. 260—326.8      5 Claims

ABSTRACT OF THE DISCLOSURE

Certain 3-di-substituted methylene pyrrolidines having a 1- or N-lower-alkyl substituent having at least two carbon atoms are especially effective anti-depressants. The compounds have the formula given immediately below.

---

This invention relates to certain novel heterocyclic substituted pyrrolidine compounds and salts thereof, and methods for their preparation. The present application is a continuation-in-part of our application Ser. No. 812,975, filed Apr. 1, 1969, now abandoned, which in turn was a continuation of our application Ser. 570,695, filed Aug. 8, 1966. Compositions of the presently-claimed compounds and a method of treating depression therewith are claimed in our U.S. Pat. 3,458,635, issued July 29, 1969, on application Ser. No. 570,717, also filed Aug. 8, 1966.

The novel substituted pyrrolidines of the present invention have the following structural formula:

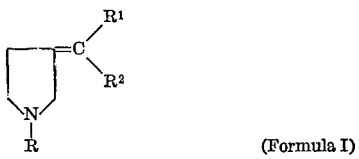

(Formula I)

wherein:

R is selected from the group consisting of hydrogen, lower-alkyl, phenyl-lower-alkyl, substituted phenyl-lower-alkyl, cycloalkyl, phenoxylower-alkyl, phenylamino-lower-alkyl, and substituted phenyl, said lower-alkyl being limited to contain 2 to 8 carbon atoms when $R^1$ and $R^2$ are both phenyl;
$R^1$ is selected from the group consisting of lower-alkyl, phenyl-lower-alkyl, cycloalkyl, phenyl and substituted phenyl, and
$R^2$ is selected from the group consisting of phenyl and substituted phenyl, and
acid addition salts thereof.

The compounds of this invention possess important pharmacological activity indicative of their usefulness in counteracting certain physiological abnormalities in an animal body. In particular, they possess anti-depressant (or mood elevating) imipramine-like anti-depressant pharmacological activity, and are, therefore, useful as such. The compounds of Formula I demonstrate their anti-depressant activity in tests such as proposed by Dr. Beryl M. Askew, Life Sciences, No. 10, pages 725–730, 1963, for instance reserpine reversal, and the anti-tetrabenazine test, now more fully described at J. Med. Chem. 11, No. 2, page 325, et seq.

One particular advantage of these compounds and compositions containing the same is that they exhibit no significant monamine oxidase inhibition, and consequently, will not create a hypertensive crisis following ingestion of high protein meals.

The unpredictability of the anti-depressant activity of the compounds claimed in this application has been recognized by the grant of U.S. Pat. 3,458,635. In addition, the unpredictability of anti-depressant activity of the corresponding N-methyl compound has also been recognized by the grant of U.S. Pat. 3,458,635. Moreover, the compounds of the present invention possess an unpredictable advantage of increased anti-depressant potency and improved therapeutic ratio when compared with the corresponding N-methyl compound. It is therefore, a primary object of this invention to provide certain new and useful substituted pyrrolidine compounds having the formula described above, and to further provide methods for preparing the same. Other objects of this invention will be apparent to one skilled in the art.

The preferred method of preparing the compounds of this invention comprises the step of dehydrating a compound of the following formula:

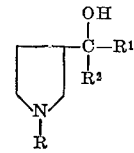

(Formula II)

The starting alcohols of Formula II may be obtained by procedures described in detail in copending application by Carl D. Lunsford et al., Ser. No. 570,722, filed Aug. 8, 1966, entitled, "Esters of 1-Substituted-3-Disubstituted Pyrrolidine Methanols," now U.S. Pat. No. 3,479,370.

In general, the starting alcohols of Formula II may be prepared from 1-substituted-3-cyanopyrrolidines or 1-substituted-2-pyrrolidinones. The preparation of 1-substituted-3-cyanopyrrolidines has been disclosed in copending application Ser. No. 493,887 filed Oct. 7, 1965, now U.S. Pat. 3,318,908. The 1-substituted-2-pyrrolidinones are prepared by procedures well known in the art.

Utilizing the cyanopyrrolidines of the formula

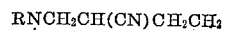

(all symbols as being defined above in connection with Formula I except that R cannot be hydrogen) they are reacted with a phenylmagnesium halide, a substituted phenylmagnesium halide or with a metal aryl such as phenyllithium. This reaction results in production of a 1-substituted - 3 - benzoylpyrrolidine or a 1-substituted-3-substituted benzoylpyrrolidine of the formula

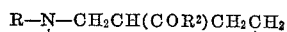

The 1-substituted - 3 - benzoylpyrrolidine or the 1-substituted-3-substituted benzoylpyrrolidine is then reacted with an excess of a lower-alkyl, phenyl, phenyl alkyl, substituted phenyl alkyl or a cyclo-alkyl metal halide, or is reduced by metal hydride reduction to give a 1-substituted-α,α-disubstituted-3-pyrrolidinemethanol of the formula

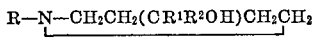

When R in Formula I is hydrogen the compound is prepared starting from a 1-benzyl-α,α-disubstituted-3-pyrrolidinemethanol prepared as described above, the benzyl group being removed by hydrogenolysis as described in the following example preparation.

PREPARATION

Product: α-methyl-α-phenyl-3-pyrrolidinemethanol

A solution of 129 g. (0.46 mole) of 1-benzyl-α-methyl-α-phenyl-3-pyrrolidinemethanol in 150 ml. of 95% ethanol was placed in the reaction bottle of the catalytic reduction apparatus and 6 g. of 10% palladium-on-charcoal catalyst was added. The mixture was heated at 70° C. and shaken with hydrogen until an equivalent of hydrogen was absorbed (about two hours). After cooling, the suspension was filtered, and the solvent evaporated. The residue was distilled at reduced pressure and the fraction boiling at 111–113°/0.2 mm. collected. The water-white, viscous oil which solidified on cooling (M.P. 80–100°) weighed 52 g. (59% yield).

Analysis.—Calculated for $C_{12}H_{17}NO$ (percent): C, 75.35; H, 8.96; N, 7.32. Found (percent): C, 75.18; H, 9.06; N, 7.37.

In using the 1-substituted-2-pyrrolidone of the formula

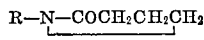

(or as indicated above in connection with Formula I, the initial reaction is with a ketone of the formula $R^1COR^2$.

The reaction is carried out in liquid ammonium in the presence of an alkali amide condensing agent to give a 1-substituted-2-oxo-α,α-disubstituted-3-pyrrolidinemethanol of the formula

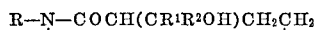

The alcohol thus formed is reduced by metal hydride reduction to give a 1-substituted-α,α-disubstituted-3-pyrrolidinemethanol of the formula

The dehydration reaction may be carried out by mixing a Formula II alcohol with an acid, including the use of a compound which is capable of forming an acid in situ in the reaction mixture in question. It is advantageous to use a strong mineral or organic acid such as a hydrogen halide, e.g., hydrochloric acid, or sulfuric acid, either concentrated or dilute, or in admixture with acetic acid, trichloroacetic acid, or a sulfonic acid such as benzenesulfonic or p-toluene sulfonic acid, or a compound which is capable of forming a strong acid in the reaction mixture, the dehydration thereby proceeding especially readily and smoothly. As an example, of such latter type compounds may be mentioned inorganic acid halides such as thionyl chloride, sulfuryl chloride, and phosphoric acid halides, such as phosphorus oxychloride and phosphorus trichloride, organic acid halides such as acetyl chloride and benzoyl chloride, and acid anhydrides such as sulfur trioxide, and the like.

In addition, weaker acids or compounds which are capable of forming weaker acids in the reaction mixture may sometimes be used to effect the dehydration. As examples may be mentioned phosphoric acids, especially dilute phosphoric acid, dichloroacetic acid, oxalic acid, succinic acid, citric acid, boric acid, boric acid triacetate, and the like.

The said dehydration may in many cases be effected even with very small amounts of the said acids or acid-forming compounds and, according to a specially convenient modification procedure, such an acid or compound is used in the dhydration step in an amount substantially smaller than that equivalent to the saturated hydroxy-substituted starting material. In this manner, the formation of byproducts which might otherwise result from the dehydration is avoided or limited.

Further, it has been found that the dehydration proceeds especially readily and smoothly when carried out in the presence of an agent capable of binding the water liberated by the reaction, such as sodium sulfate or the like.

Likewise, it is sometimes advantageous to undertake the dehydration step in the presence of a solvent. Examples of suitable solvents are hydrocarbons, especially aromatic hydrocarbons such as benzene, toluene, or xylene, halogenated hydrocarbons such as chloroform, alkanols such as methanol and ethanol, ethers, acetic acid, and the like.

The dehydration in many cases proceeds smoothly even at room temperature and, especially in cases where the dehydration is effected by a strong acid or a compound capable of forming such strong acid in the reaction mixture in question, in an amount approximately equivalent to the amount of saturated hydroxy-substituted starting material or in excess. It is advantageous in some cases to carry out the dehydration while cooling in order to limit the formation of byproducts.

In order to secure a reasonable time of reaction, it may be convenient in other cases to omit cooling of the reaction mixture or even to undertake the dehydration at an increased temperature, e.g., in the vicinity of the boiling point of a solvent chosen for the dehydration step, e.g., up to about 120° C. However, no substantial amounts of byproducts are or need be formed even at such increased temperatures, it only being necessary that the acid or acid-providing compound be used in case of higher temperatures in an amount substantially less than that equivalent to the starting saturated hydroxy compound.

To illustrate the preferred process of the present invention, the following specific example is given:

EXAMPLE 1A 3-ethylphenylmethylenepyrrolidine was prepared by mixing 6.0 grams (0.029 mole) of α-ethyl-α-phenyl-3-pyrrolidine methanol and 60 ml. of 6N hydrochloric acid. The reaction mixture was heated to reflux temperature and refluxed for 16 hours, and cooled and made basic with 25% sodium hydroxide. An oily layer separated to the bottom and was extracted with a solvent such as ether and the combined extracts were washed several times with cold water. The ether which acted as a solvent and did not enter the reaction, was then evaporated and the residual oil was distilled at reduced pressure and the fraction boiling at 75–77°/.02 mm. was collected; the non-viscous water-white oil weighed 3.5 grams (64% yield).

Analysis.—Calcd. for $C_{13}H_{17}N$ (percent): C, 83.37; H, 9.15. Found (percent): C, 83.18; H, 8.95.

EXAMPLE 1B

Product: 1-ethyl-3-diphenylmethylenepyrrolidine hydrochloride

To 150 ml. of 6 N HCl was added 20 grams (0.07 mole) of α,α-diphenyl-1-ethyl-3-pyrrolidinemethanol which was refluxed with magnetic stirring overnight. The reaction mixture was then cooled with ice bath and extracted twice with ether. The aqueous acidic layer was separated, made basic with 50% NaOH (in the cold) and extracted several times with ether. The ether extracts were combined, washed with water, and dried over $Na_2SO_4$. The ether extracts were evaporated, and the oily residue crystallized on standing. The oil was vacuum distilled at B.P. 135–140°/0.15 mm. A second distillation at B.P. 120–124°/0.015 mm. gave an oil which crystallized as the free base. M.P. 45–46° C. The oil (or crystallized free base) was dissolved in anhydrous ethyl ether and was converted to the HCl salt by addition of ethereal HCl. Rubbing gave white crystals which could be recrystallized from absolute ethanol-ether mixture. The salt melted at 191–192° C. The yield was 14 grams (75%).

*Analysis.*—Calcd. for $C_{19}H_{22}NCl$: C, 76.11; H, 7.40; N, 4.67; $Cl^-$, 11.82. Found (percent): C, 75.91; H, 7.54; N, 4.73; $Cl^-$, 11.68.

In general, the reaction product may be isolated as indicated in the foregoing examples, or in any suitable manner. Thus, the basic product may be taken up in acid, neutral material separated therefrom by extraction of the aqueous solution with an organic solvent (e.g., ether, ethyl acetate or toluene) and the basic product liberated from the acid solution by making the solution strongly basic. The product thus liberated may be taken up in an organic solvent (e.g., ether, chloroform, ethyl acetate or toluene), dried over an anhydrous salt which will form a hydrate (e.g. sodium sulfate, potassium carbonate or calcium sulfate), concentrated and distilled in vacuo.

The compounds of this invention (Formula I), may be converted to and are most conveniently employed in the form of non-toxic pharmaceutically acceptable acid addition salts. Such salts also have improved water-solubility. Although the non-toxic salts are preferred, any salt may be prepared for use as a chemical intermediate, as in the preparation of another, but non-toxic salt. The free basic compounds of Formula I may be alternatively, conveniently converted to their quaternary ammonium or acid addition salts by reaction of the free base with the selected acid or acid ester, e.g., an alkyl, cycloalkyl, alkenyl, cycloalkenyl or aralkyl halide, sulfate, or sulfonate, preferably in the presence of an organic solvent inert to the reactants and reaction products under the conditions of the reaction. The acids which can be used to prepare the preferred non-toxic acid addition salts are those which produce, when combined with the free bases, salts the anions of which are relatively innocuous to the animal organism in thereapeutic doses of the salts, so that beneficial physiological properties inherent in the free bases are not vitiated by side-effects ascribable to the anions.

Appropriate acid addition salts are those derived from mineral acids such as hydrochloric acid, hydrobromic acid, hydriodic acid, nitric acid, sulfuric acid, and phosphoric acid; and organic acids such as acetic acid, citric acid, lactic acid, fumaric acid, and tartaric acid.

The acid addition salts are prepared either by dissolving the free base in an aqueous solution containing the appropriate acid and isolating the salt by evaporating the solution, or by reacting the free base and the selected acid in an organic solvent, in which case, the salt ordinarily separates directly or can be conventionally recovered by concentration of the solution or the like. Conversely, the free base may be obtained conventionally by neutralizing the acid addition salt with an appropriate base such as ammonia, ammonium hydroxide, sodium carbonate or the like, extracting the liberated base with a suitable solvent, illustratively ethyl acetate or benzene, drying the extract and evaporating to dryness or fractionally distilling, or in other conventional manner.

The terms as used herein to define the symbols in any of the formulas given above, or where they appear elsewhere in the specification and claims hereof, have the following significance:

"Lower-alkyl" includes straight and branched chain radicals of up to eight carbon atoms inclusive, and is exemplified by such groups as methyl, ethyl, propyl, isopropyl, tertiary butyl, amyl, isoamyl, hexyl, heptyl, octyl, and the like;

"Cycloalkyl" includes primarily cyclic alkyl radicals containing three up to nine carbon atoms inclusive and encompasses such groups as cyclopropyl, cyclobutyl, cyclohexyl, cyclopentyl, propylcyclopentyl, dimethylcyclohexyl, cycloheptyl, and cyclooctyl;

"Substituted phenyl" radical is a phenyl radical substituted by a radical or radicals which are not reactive or otherwise interfering under the conditions of reaction, such radicals including lower-alkoxy, loweralkyl, di-lower-alkylamino, trifluoro-methyl, halo, and the like. The substituted phenyl radicals have preferably no more than one to three substitutents such as those given above and, furthermore, these substitutents can be in various available positions of the phenyl nucleus and, when more than one substitutent is present, can be the same or different and can be in various position combinations relative to each other. The lower-alkoxy, lower-alkyl and di-lower-alkylamino substitutents each have preferably from one to four carbon atoms which can be arranged as straight or branched chains. A total of nine carbon atoms in all ring substitutents, making a total of fifteen carbon atoms in the radical, is the preferred maximum.

The following examples are given by way of illustration only and are not to be construed as limiting.

EXAMPLE 1C

Product: 3-($\alpha$-methylbenzylidene)-pyrrolidine

A solution of 31 g. of $\alpha$-methyl-$\alpha$-phenyl-3-pyrrolidinemethanol hydrochloride in 50 ml. of 12 N HCl was prepared and heated on a steam bath for 15 minutes. The solution was cooled, diluted with ice-water and treated with cold 25% sodium hydroxide until basic. A gummy precipitate resulted which was extracted into chloroform and then dried over magnesium sulfate and evaporated under reduced pressure to an oil. The product distilled at 160–162° C./15 mm.: yield 14.6 grams (62%). The nuclear magnetic resonance spectrum indicated that the product was a mixture of isomers.

*Analysis.*—Calcd. for $C_{12}H_{15}N$ (percent): C, 83.19; H, 8.73; N, 8.09. Found (percent): C, 83.08; H, 8.71; N, 8.04.

EXAMPLE 2

Product: 1-benzyl-3-diphenylmethylene-pyrrolidine hydrochloride 1-benzyl-$\alpha,\alpha$-diphenyl-3-pyrrolidinemethanol (34.4 g.; 0.10 mole) was mixed with 250 ml. of 6 N HCl, and 50 ml. of 95% ethanol, stirred, heated to reflux temperature and refluxed overnight. An oily layer separated to the bottom on cooling. The oily layer was separated and partitioned between dilute caustic solution and ether. The ether layer was separated, washed with water, dried over magnesium sulfate, filtered and concentrated by evaporation. The product was an oil, and a hydrochloride salt was formed therefrom by preparing an isopropanol solution and treating with etheral HCl. The salt recrystallized finally in a white, crystalline form from isopropanol containing a trace of acetone and vacuum dried to a final melting point of 167–168° C. Yield of the white crystals: 20.8 grams, 57.5%.

*Analysis.*—Calcd. for $C_{24}H_{24}Cl\ N$ (percent): C, 79.65; H, 5.58; N, 3.87. Found (percent): C, 79.59; H, 6.65; N, 3.84.

EXAMPLE 3

Product: 3-diphenylmethylenepyrrolidine hydrochloride

A mixture of $\alpha,\alpha$-diphenyl-3-pyrrolidinemethanol (21.4 grams, or 0.08 mole) and 300 ml. of 6 N HCl was prepared and heated to reflux temperature. Dehydration occurred rapidly precipitating the hydrochloride salt product. The reaction mixture was allowed to cool and the product removed by suction filtration, washed with water, and vacuum dried. Upon recrystallization from water with a trace of isopropanol, the product had a final melting point of 268°–271° C.

*Analysis.*—Calcd. for $C_{17}H_{17}NCl$ (percent): $Cl^-$, 13.05; N, 5.15. Found (percent): $Cl^-$, 13.05; N, 5.20.

EXAMPLE 4

Product: 1-benzyl-3-(methylphenylmethylene)-pyrrolidine

Ten grams of 1-benzyl-$\alpha$-methyl-$\alpha$-phenyl - 3 - pyrrolidinemethanol and 100 ml. of 6 N HCl were combined, heated to reflux temperature, refluxed for 16 hours, and cooled. The reaction mixture was then made basic by addition of 25% sodium hydroxide. An oily layer which formed was extracted with ether and the combined extracts were washed with water and finally dried over magnesium sulfate. After evaporation of the solvent, the residual oil was distilled at reduced pressure and the fraction boiling at 125–127° C./.01 mm., was collected. The non-viscous nearly water-white oil product weighed 7.0 grams (75% yield).

*Analysis.*—Calculated for $C_{19}H_{21}N$ (percent): C, 86.64; H, 8.04. Found (percent): C, 86.54; H, 7.96.

EXAMPLE 5

Product: 3-cyclohexylphenylmethylene-1-methylpyrrolidine

A mixture of 6.0 g. of 1-methyl-α-cyclohexyl-α-phenyl-3-pyrrolidinemethanol and 50 ml. of 6 N hydrochloric acid was refluxed for 16 hours under an atmosphere of nitrogen, cooled and made basic with 25% sodium hydroxide. The oil which separated was extracted with benzene and the combined extracts were washed several times with water. After the solvent was evaporated, the residual oil was distilled at reduced pressure and the fraction boiling at 105–107°/.07 mm. collected. The water-white, non-viscous oil weighed 4.1 grams (73% yield).

*Analysis.*—Calcd. for $C_{18}H_{25}N$ (percent): C, 84.65; H, 9.87. Found (percent): C, 84.68; H, 10.08.

EXAMPLE 6

Product: 1-(2-phenylethyl)-3-diphenylmethylene-pyrrolidine

A solution containing 16.0 g. (0.045 mole) of 1-(2-phenylethyl)-α,α-diphenyl-3-pyrrolidinemethanol, 125 ml. 6 N HCl, and 75 ml. ethanol was refluxed with stirring for 6 hours. Upon cooling, an oil was separated and partitioned between water and ether then made basic with $K_2CO_3$. The ether extracts were dried over $Na_2SO_4$, filtered, evaporated, and the remaining oil was vacuum distilled, B.P. 197–200° C./7.5 mm. to yield 8.3 grams of viscous oil. A sample of the oil was analyzed.

*Analysis.*—Calcd. for $C_{25}H_{25}N$ (percent): C, 88.45; H, 7.42; N, 4.13. Found (percent): C, 88.33; H, 7.33; N, 4.30.

In the manner of the dehydration method described above and, particularly in accord with the foregoing examples, the following may be prepared from the stated reactants:

(a) 1 - ethyl-3-cyclohexylphenylmethylene pyrrolidine from 1 - ethyl-α-cyclohexyl-α-phenyl-3-pyrrolidinemethanol.

(b) 1-methyl-3-cyclohexylphenylmethylene pyrrolidine from 1-methyl-α-cyclohexyl-α-phenyl-3-pyrrolidinemethanol.

(c) 1-(2-phenylethyl)-3-diphenylmethylene pyrrolidine from 1 - (2-phenylethyl)-α,α-diphenyl-3-pyrrolidinemethanol.

(d) 1 - (o-chlorobenzyl) - 3 - di-(p-methoxyphenyl)-methylene pyrrolidine from 1 - (o-chlorobenzyl)-α,α-di-(p-methoxyphenyl)-3-pyrrolidinemethanol.

(e) 1-cyclohexyl-3-methylphenylmethylene pyrrolidine from 1-cyclohexyl-α-methyl-α-phenyl-3-pyrrolidinemethanol.

(f) 1 - (2 - phenoxyethyl)-3-(p-chlorophenyl)-phenylmethylene pyrrolidine from 1 - (2 - phenoxyethyl)-α-(p-chlorophenyl)-α-phenyl-3-pyrrolidinemethanol.

(g) 1 - (2 - phenylaminoethyl)-3-(m-trifluoromethylphenyl)-phenylmethylene pyrrolidine from 1-(2-phenylaminoethyl)-α-phenyl - α - (m-trifluoromethylphenyl)-3-pyrrolidinemethanol.

(h) 1-phenyl - 3 - (o-chlorophenyl)-phenylmethylene pyrrolidine from 1-phenyl-α-(o-chlorophenyl)-α-phenyl-3-pyrrolidinemethanol.

(i) 1-(o-tolyl) - 3 - (o-methoxyphenyl)-phenylmethylene pyrrolidine from 1 - o-tolyl-α-(o-methoxyphenyl)-α-phenyl-3-pyrrolidinemethanol.

(j) 1-ethyl - 3 - di(p-tolyl)-methylene pyrrolidine from 1 - ethyl-α,α-di-(p-tolyl)-3-pyrrolidinemethanol.

(k) 1-ethyl - 3 - ethyl(p-dimethylaminophenyl)-methylene pyrrolidine from 1-ethyl-α-ethyl-α-(p-dimethylaminophenyl)-3-pyrrolidinemethanol.

(l) 1-methyl-3-phenyl-(p-tolyl)-methylene pyrrolidine from 1 - methyl-α-phenyl-α-(p-tolyl)-3-pyrrolidinemethanol.

(m) 1 - methyl-3-phenylmethylene pyrrolidine from 1-methyl-α-phenyl-3-pyrrolidinemethanol.

(n) 3 - phenyl-3-(m-trifluoromethylphenyl)-methylene pyrrolidine from α-phenyl-α-(m-trifluoromethylphenyl)-3-pyrrolidinemethanol.

(o) Di-(p-tolyl)-methylene pyrrolidine from α,α-di(p-tolyl)-3-pyrrolidinemethanol.

The activity of the pharmacologically active agents of the present invention, as evidenced by tests in lower animals, is indicative of utility in human beings, as well as in lower animals.

Effective quantities of any of the foregoing pharmacologically active compounds of Formula I may be administered to a living animal body for therapeutic purposes according to usual modes if administration and in usual forms, such as solutions, emulsions, suspensions, pills, tablets, and capsules. The compounds may be administered alone or in combination with other pharmacologically effective agents such as analgesics, sedatives, antiacids, tranquilizers, etc., as well as buffers and usual pharmaceutical carriers or diluents.

Although very small quantities of the active materials of the present invention are effective when minor therapy is involved or in cases of administration to subjects having a relatively low body weight, unit dosages are usually from 5 milligrams or above and preferably 25, 50, or 100 milligrams or even higher, depending of course upon the emergency of the situation and the particular result desired. Five to 50 milligrams appears optimum per unit dose, or usual broader ranges appear to be 1 to 100 milligrams per unit dose. The active ingredients of the invention may be combined with other pharmacologically active agents as stated above. It is only necessary that the active ingredient constitute an effective amount, i.e., such that a suitable effective dosage will be obtained consistent with the dosage form employed. Obviously, several unit dosage forms may be administered at about the same time. The exact individual dosages as well as daily dosage will, of course, be determined according to standard medical principles under the direction of a physician or veterinarian.

Various modifications and equivalents will be apparent to one skilled in the art and may be made in the compounds, methods and procedures of the present invention without departing from the spirit or scope thereof, and it is therefore to be understood that the invention is to be limited only by the scope of the appended claims.

We claim:

1. A compound selected from the group consisting of
(a) 3-disubstituted methylene pyrrolidines of the formula:

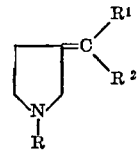

wherein:

R is lower alkyl, said lower alkyl being limited to contain 2–8 carbon atoms, $R^1$ is phenyl, $R^2$ is selected from the group consisting of lower alkyl, phenyl and monosubstituted phenyl wherein the substituent is selected from the group consisting of lower alkoxy and trifluoromethyl, and (b) non-toxic pharmaceutically acceptable acid addition salts thereof.

2. A compound of claim 1 which is 1-lower alkyl-3-diphenylmethylene pyrrolidine, said lower-alkyl containing 2 to 8 carbon atoms.

3. A compound of claim 1 which is 1-ethyl-3-diphenylmethylene pyrrolidine.

4. A compound of claim 5 which is 1-ethyl-3-diphenylmethylene pyrrolidine hydrochloride.

5. A compound of claim 1 which is 1-ethyl-3-diphenylmethylene pyrrolidine non-toxic pharmaceutically acceptable acid addition salt.

References Cited

UNITED STATES PATENTS 3,458,635  7/1969  Lunsford et al. _____ 424—274

FOREIGN PATENTS 654,416  4/1965  Belgium.
40/22,462  10/1965  Japan

OTHER REFERENCES

Oki: Chem. Abs. 63–18034b (1965), abs. of Japanese Pat. 40/17,015.

ALEX MAZEL, Primary Examiner

J. A. NARCAVAGE, Assistant Examiner

U.S. Cl. X.R.

260—326.5 R, 326.5 M, 326.62; 424—274

UNITED STATES PATENT OFFICE
CERTIFICATE OF CORRECTION

AHR 117D

Patent No. 3,732,247  Dated May 8, 1973

Inventor(s) Carl D. Lunsford, et al.

It is certified that error appears in the above-identified patent and that said Letters Patent are hereby corrected as shown below:

PATENT READS:

Col. 1, lines 28&29

"filed August 8, 1966"

Col. 3, line 23
"111-113°/0.2 mm."

Col. 3, line 29
"pyrrolidone"

Col. 4, line 2
"dhydration"

APPLICATION READS:

Response & Amendment of December 18, 1972
---filed August 8, 1966, also now abandoned---

Page 3A, line 9
---111-113°/.02 mm.

Page 3A, line 14
---pyrrolidinone---

Page 5, line 6
---dehydration---

Col. 5, line 27 - "quaternary ammonium or" should have been deleted

Col. 5 lines 29 and 30 - beginning "or acid" and ending "or sulfonate" should have been deleted.

Col. 8, line 23
"modes if"

Page 17, line 17
---modes of---

Signed and sealed this 25th day of December 1973.

(SEAL)
Attest:
EDWARD M. FLETCHER, JR
Attesting Officer

RENE D. TEGTMEYER
Acting Commissioner of Patents

FORM PO-1050 (10-69)